(12) United States Patent
Chun et al.

(10) Patent No.: US 7,261,176 B2
(45) Date of Patent: Aug. 28, 2007

(54) ARTICULATED VEHICLE SUSPENSION SYSTEM SHOULDER JOINT

(75) Inventors: Wendell H. Chun, Littleton, CO (US); Michael S. Beck, Colleyville, TX (US); Jon T. Stinchcomb, Arlington, TX (US); David A. Clemens, Orange, CA (US); John C. Dunne, Costa Mesa, CA (US); Eric N. Anderfaas, Westminster, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 290 days.

(21) Appl. No.: 10/639,281

(22) Filed: Aug. 12, 2003

(65) Prior Publication Data
US 2005/0145428 A1    Jul. 7, 2005

Related U.S. Application Data

(60) Provisional application No. 60/449,271, filed on Feb. 21, 2003.

(51) Int. Cl.
*B62D 6/12* (2006.01)
(52) U.S. Cl. ..................................... 180/209
(58) Field of Classification Search ............... 180/209, 180/212, 211, 213, 214, 337, 341, 342
See application file for complete search history.

(56) References Cited

U.S. PATENT DOCUMENTS

| 3,409,100 A | 11/1968 | Kronqvist ............... 180/6.54 |
| 3,513,927 A | 5/1970 | Kozowyk .................. 180/41 |
| 3,566,825 A | 3/1971 | Ruf et al. .................. 115/1 |
| 3,649,981 A | 3/1972 | Woodworth .................. 15/83 |
| 3,666,036 A | 5/1972 | Scerbo .................. 180/43 R |
| 4,021,690 A | 5/1977 | Burton .................. 310/67 R |
| 4,056,158 A | 11/1977 | Ross .................. 180/6.48 |
| 4,176,726 A | 12/1979 | Schaeff .................. 180/15 |
| 4,491,207 A | 1/1985 | Boonchanta et al. ....... 188/299 |
| 4,600,069 A | 7/1986 | Oswald et al. ........... 180/24.02 |
| 4,721,177 A | 1/1988 | Qizhen .................. 180/205 |
| 4,836,342 A | 6/1989 | Wolfe .................. 188/319 |

(Continued)

FOREIGN PATENT DOCUMENTS

CH        295 771        3/1954

(Continued)

OTHER PUBLICATIONS

International Search Report dated May 7, 2004 (PCT/US/03/38918; 2063.003810).

*Primary Examiner*—Faye M. Fleming
(74) *Attorney, Agent, or Firm*—Williams, Morgan & Amerson, PC

(57) ABSTRACT

An articulated vehicle suspension system shoulder joint is disclosed. A vehicle includes a plurality of wheel assemblies; a plurality of rotating shoulder joints, each wheel assembly being mounted to a respective one of the shoulder joints and rotatable in a plane by the respective shoulder joint; and a chassis to which the shoulder joints are mounted. The shoulder joint for use in a vehicle suspension system includes a housing to which a wheel assembly may be attached for in-plane rotation; a drive; and a transmission engaged with the housing and the drive to reduce the speed of the drive motor as it drives the housing.

22 Claims, 12 Drawing Sheets

U.S. PATENT DOCUMENTS

| | | | |
|---|---|---|---|
| 4,921,272 A | 5/1990 | Ivers | 280/707 |
| 4,977,971 A | 12/1990 | Crane, III et al. | 180/8.3 |
| 5,248,008 A | 9/1993 | Clar | 180/9.32 |
| 5,276,623 A | 1/1994 | Wolfe | 364/424.05 |
| 5,277,281 A | 1/1994 | Carlson et al. | 188/267 |
| 5,372,211 A | 12/1994 | Wilcox et al. | 180/8.2 |
| 5,515,934 A | 5/1996 | Davis | 180/8.2 |
| 5,549,837 A | 8/1996 | Ginder et al. | 252/62.52 |
| 5,652,704 A | 7/1997 | Catanzarite | 364/424.059 |
| 5,693,004 A | 12/1997 | Carlson et al. | 601/23 |
| 5,711,746 A | 1/1998 | Carlson | 482/112 |
| 5,816,372 A | 10/1998 | Carlson et al. | 188/267.2 |
| 5,823,309 A | 10/1998 | Gopalswamy et al. | 192/21.5 |
| 5,842,547 A | 12/1998 | Carlson et al. | 188/267 |
| 5,845,753 A | 12/1998 | Bansbach | 192/21.5 |
| 5,896,965 A | 4/1999 | Gopalswamy et al. | 192/21.5 |
| 5,900,184 A | 5/1999 | Weiss et al. | 252/62.52 |
| 5,947,238 A | 9/1999 | Jolly et al. | 188/267.1 |
| 5,993,358 A | 11/1999 | Gureghian et al. | 482/54 |
| 6,095,295 A | 8/2000 | Park et al. | 188/267.2 |
| 6,095,486 A | 8/2000 | Ivers et al. | 251/129.01 |
| 6,112,843 A | 9/2000 | Wilcox et al. | 180/345 |
| 6,131,709 A | 10/2000 | Jolly et al. | 188/267.2 |
| 6,151,930 A | 11/2000 | Carlson | 68/12.06 |
| 6,199,654 B1 * | 3/2001 | Kojo et al. | 180/443 |
| 6,267,196 B1 | 7/2001 | Wilcox et al. | 180/347 |
| 6,318,522 B1 | 11/2001 | Johnston et al. | 188/267.2 |
| 2004/0163869 A1 | 8/2004 | Chun | |
| 2005/0145428 A1 | 7/2005 | Chun | |

FOREIGN PATENT DOCUMENTS

| | | |
|---|---|---|
| EP | 0872665 | 10/1998 |
| GB | 2382638 | 6/2003 |
| JP | 62251220 | 11/1987 |
| JP | 2262484 | 10/1990 |
| JP | 8169345 | 7/1996 |
| WO | WO 94/01181 | 1/1994 |
| WO | WO 01/53145 | 7/2001 |

* cited by examiner

ARTICULATED VEHICLE SUSPENSION SYSTEM SHOULDER JOINT

BACKGROUND OF THE INVENTION

We claim the earlier effective filing date of co-pending U.S. Provisional Application Ser. No. 60/449,271, entitled "Unmanned Ground Vehicle," filed Feb. 21, 2003, in the name of Michael S. Beck, et al., for all common subject matter.

1. Field of the Invention

The present invention pertains to an articulated suspension system for use in a vehicle and, more particularly, to a shoulder joint for an articulated suspension system.

2. Description of the Related Art

One fundamental part of any ground vehicle is the suspension, or that part of the vehicle's undercarriage that absorbs and/or dampens perturbations in the surface being traversed. For instance, many passenger vehicles employ shock absorbers and leaf springs to help absorb perturbations and smooth the ride for the passengers. Environmental characteristics and conditions that cause such perturbations are generically referred to as "obstacles." Obstacles may be positive, e.g., a bump in the road, or negative, e.g., a hole or trench in the road. Vehicle suspensions systems are typically designed to handle both positive and negative obstacles within predetermined limits.

The design process for a suspension system, like any engineering design effort, involves numerous performance tradeoffs depending on many factors. For instance, a car and a truck, while both passenger vehicles, may be used for different purposes—namely, transporting people and cargo, respectively. Suspensions for cars and trucks are therefore designed differently, and it is common knowledge that stiffer truck suspensions do not provide as smooth a ride as do car suspensions.

For some classes of vehicles, suspension design is somewhat more difficult than for others because of intended operating conditions. Most passenger vehicles are designed for operation on relatively smooth, constant surfaces such that obstacle negotiation is not much of an issue. However, some vehicles are intended for much harsher environments. Exemplary of this class are military vehicles, which are typically designed to overcome extreme obstacles, and typically the more extreme the better.

The present invention is directed to resolving, or at least reducing, one or all of the problems mentioned above.

SUMMARY OF THE INVENTION

In a first aspect, the invention is a vehicle comprising a plurality of wheel assemblies; a plurality of rotating shoulder joints, each wheel assembly being mounted to a respective one of the shoulder joints and rotatable in a plane by the respective shoulder joint; and a chassis to which the shoulder joints are mounted.

In a second aspect, the invention is a shoulder joint for use in a vehicle suspension system, comprising: a housing to which a wheel assembly may be attached for in-plane rotation; a drive; and a transmission engaged with the housing and the drive to reduce the speed of the drive motor as it drives the housing.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
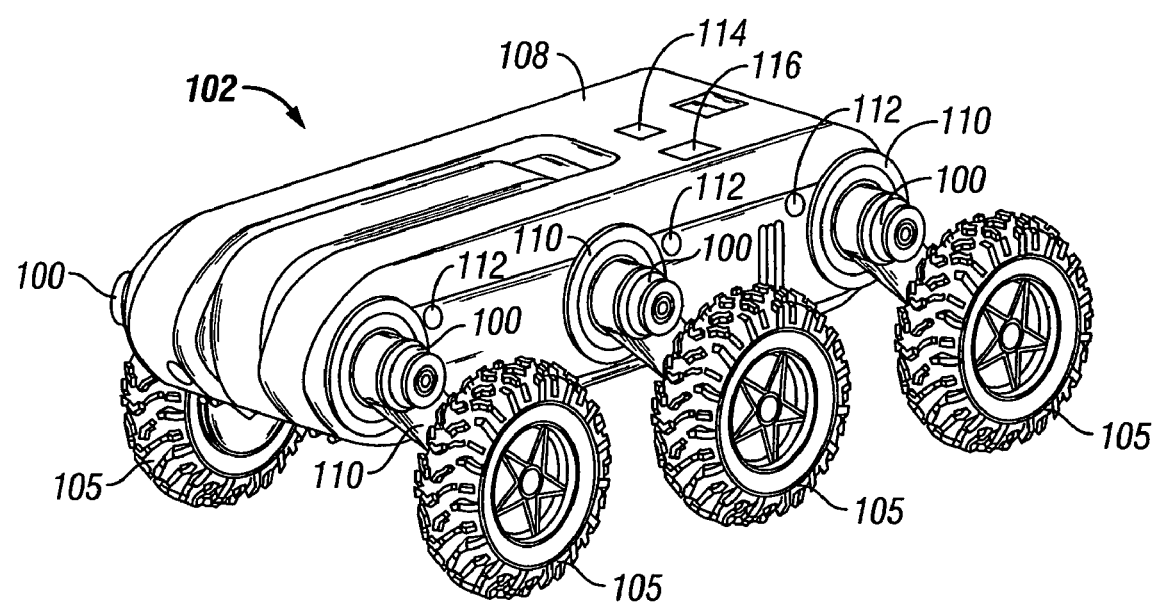
FIG. 1 depicts a vehicle employing an articulated suspension system including a shoulder joint in accordance with the present invention.
Figure 2A:
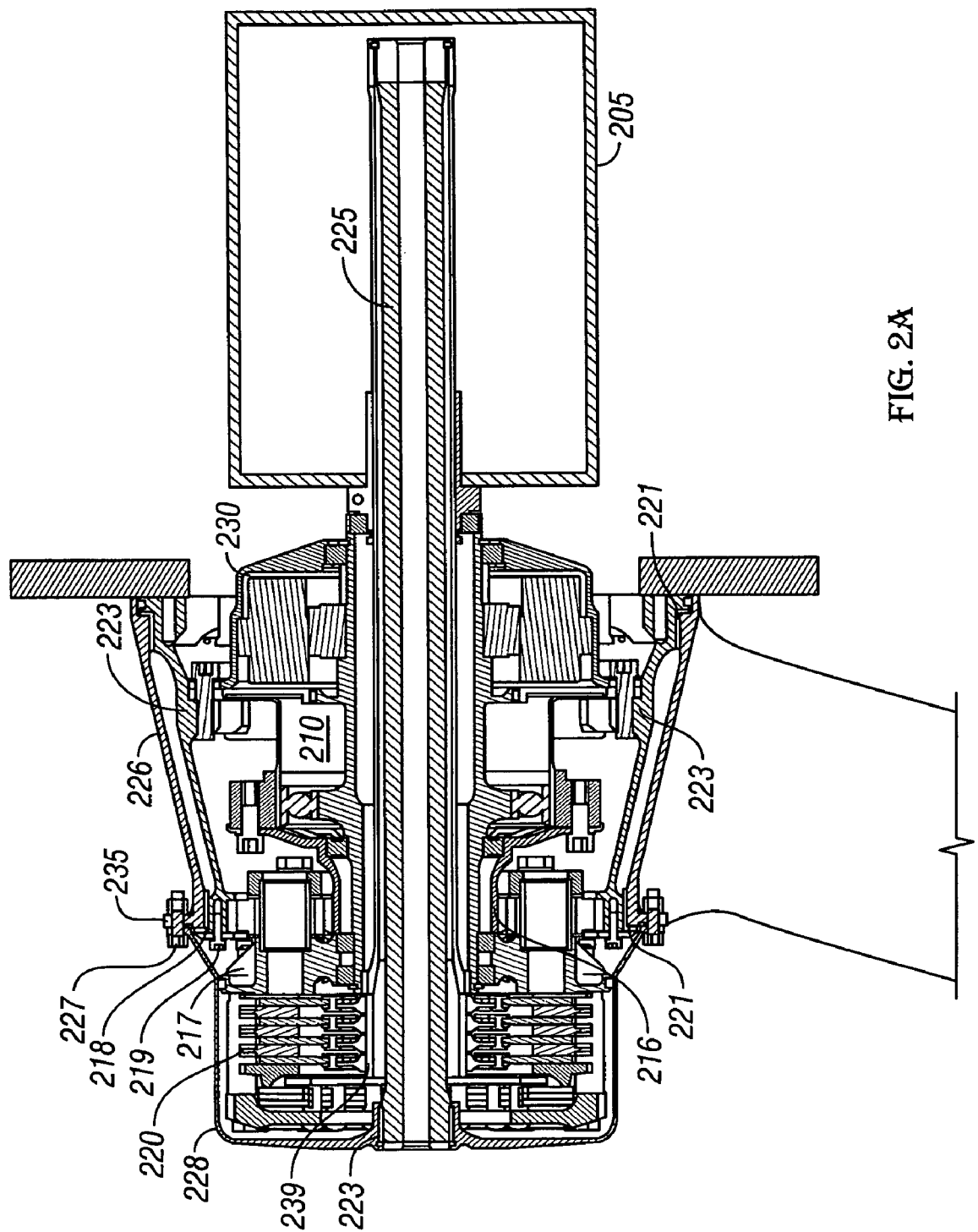
FIG. 2A–FIG. 2B detail one particular embodiment of the shoulder joint of the suspension system in FIG. 1 in an assembled, side, sectioned, plan view and in an exploded view, respectively.
Figure 2B:
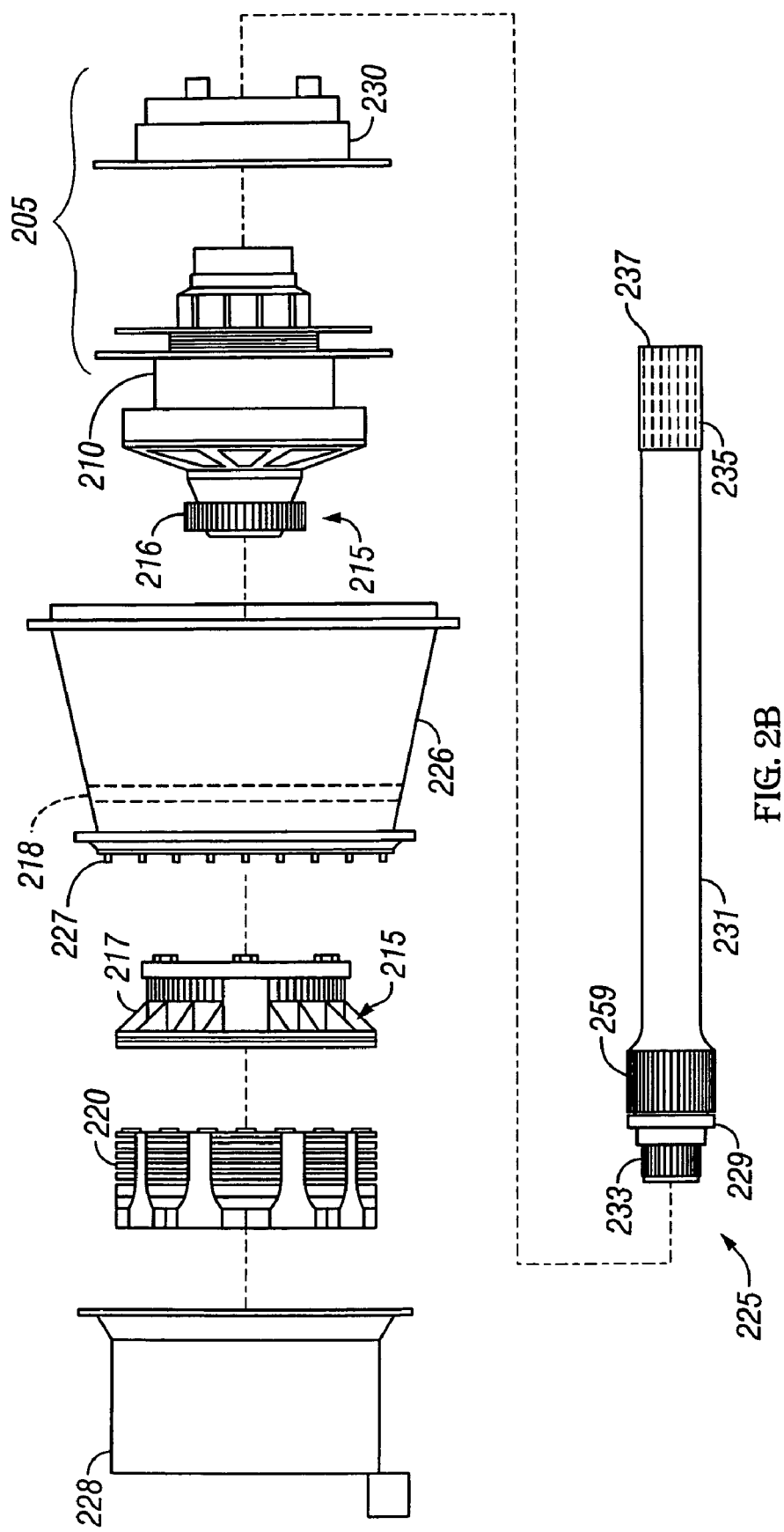
Figure 3A:
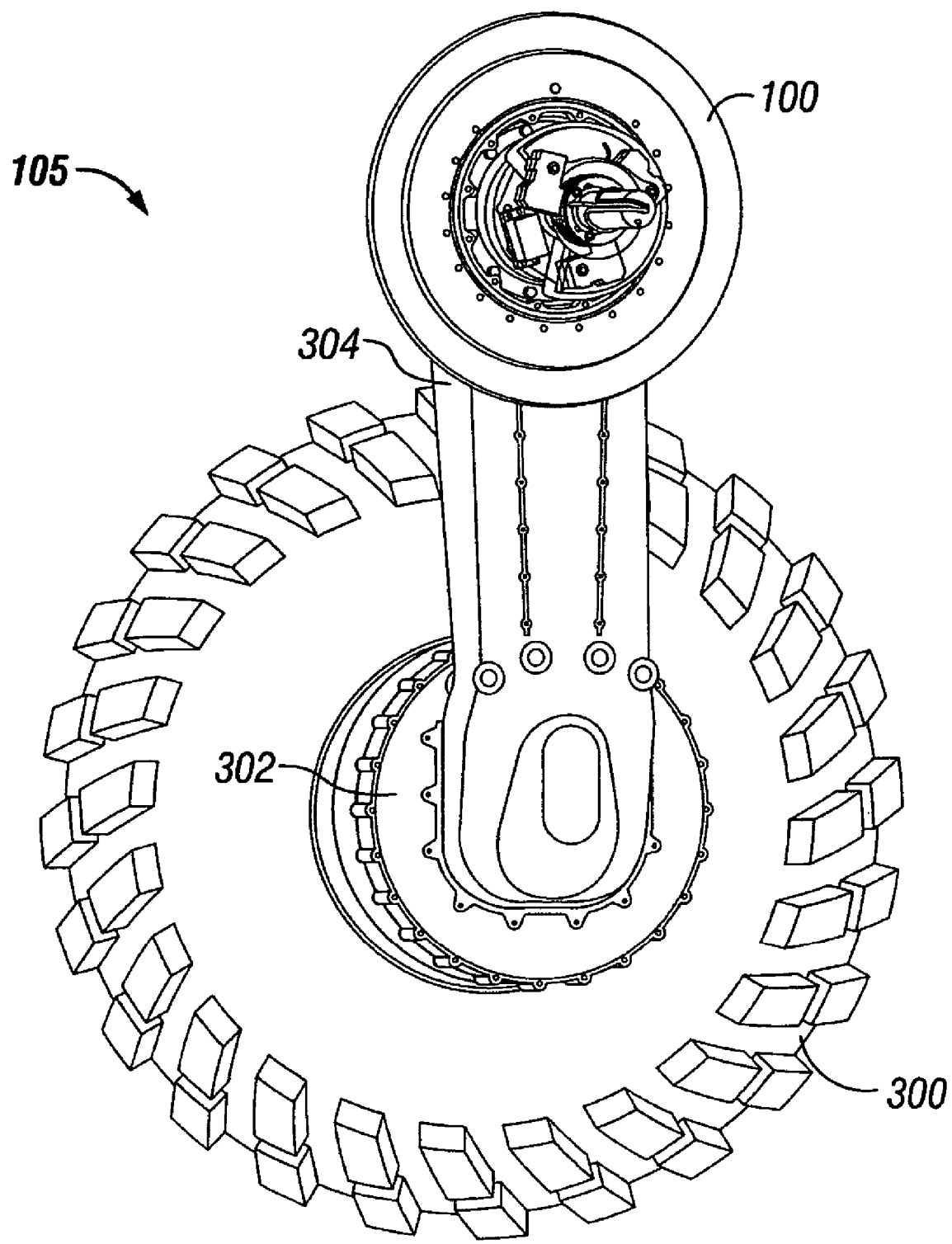
FIG. 3A–FIG. 3B depict a wheel assembly of the articulated suspension system including a wheel assembly, a link structure, and a shoulder joint in an assembled and an unassembled view, respectively.
Figure 3B:
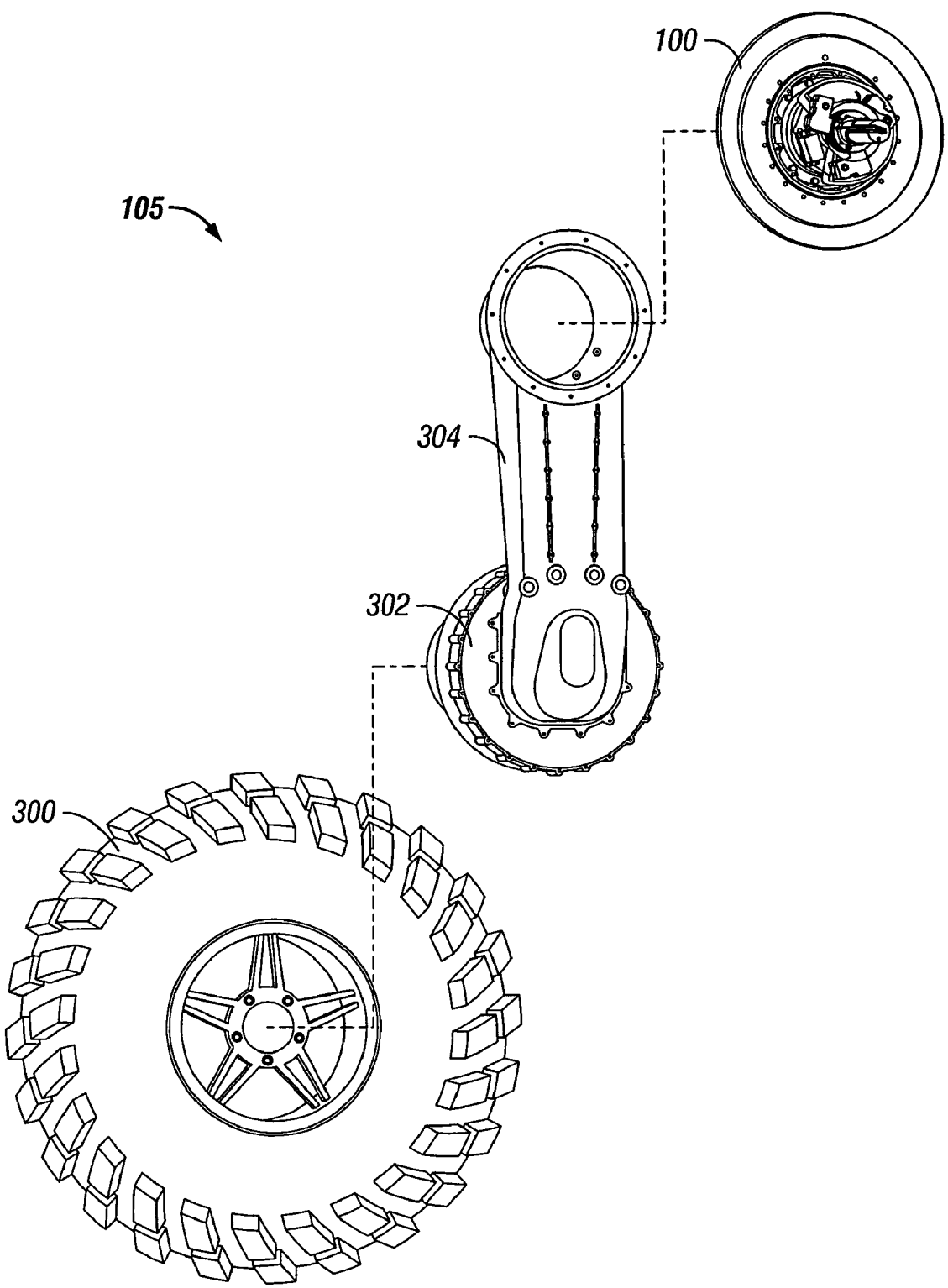

Turning now to FIG. 1, the present invention comprises a shoulder joint 100, best shown in FIG. 2A–FIG. 2B, for use in an articulated suspension system. The articulated suspension system of the illustrated embodiment supports a vehicle 102, shown in FIG. 1, through a plurality of wheel assemblies 105, shown best in FIG. 3A–FIG. 3B. Each wheel assembly 105 is mounted to a respective one of the shoulder joints 100 and is rotatable in a plane by the respective shoulder joint 100. Each wheel assembly 105 includes, as is shown in FIG. 3A–FIG. 3B, a wheel 300, a hub assembly 302, and a link structure 304. In the illustrated embodiment, the link structure 304 is a "suspension arm," and shall be hereinafter referred to as such. The present invention, however, is not so limited but, rather, may comprise any suitable link structure. The shoulder joints 100, in concert, enable independent articulation of the suspension. The shoulder joint 100 provides the high torque desirable for articulated arm movement and the rotary compliance for suspension isolation.

In addition to being the interface (structure, power, data pass thru, etc.), the shoulder joint 100 rotates in plane, preferably with a greater than a full revolution, with several revolutions desirable. This implies that the shoulder joint 100 rotates in plane via a motor/transmission package. Thus, the shoulder joint 100 comprises, in the embodiment illustrated in FIG. 2A–FIG. 2B, a drive 205, harmonic drive 210, planetary gear set 215, slip clutch 220, and torsion bar assembly 225 connected in series between the chassis 108 (shown in FIG. 1) and the suspension arm 304 (shown in FIG. 3A–FIG. 3B). The planetary gear set 215 includes a sun gear 216 that engages a planetary gear 217 that, in turn, engages a ring gear 218 on the interior of the housing 226. The torsion bar assembly 225 includes an inner torsion bar 229 and an outer torsion bar 231. The inner torsion bar 229 includes on one end thereof a plurality of splines 233 that engage an end bell 228. The inner torsion bar 229 is nested within the outer torsion bar 231, and includes on the other end a plurality of splines 234 that engage the interior of an end 237 of the outer torsion bar 231. The outer torsion bar 231 also includes a plurality of splines 239 that engages the slip clutch 220.

The shoulder joint 100 also includes a housing 226 to which the suspension arm 304 is attached. More particularly, the housing 226 is retained on a shoulder spindle 223 on the sleeve bearings 221 and a ring gear 219. The housing 226 is retained on the shoulder spindle 223 by a thrust retainer 235 secured by a plurality of fasteners 227. Note that, in the illustrated embodiment, the suspension arm 304 is fabricated integral to the housing 226, i.e., the housing 226 and the suspension arm 304 structurally form a single part. The housing 226 includes a plurality of bearings (not shown) on the inside thereof. The bearings interact with the planetary gear set 215 to rotate the housing 226 and, hence, the suspension arm 304. The shoulder joint 100 is capped, in the illustrated embodiment, by an end bell 228 to transmit torque between the torsion bar assembly 225 and the suspension arm 304 as well as to help protect the shoulder joint 100 from damage and debris.

Still referring to FIG. 2A–FIG. 2B, the drive 205 is, in the illustrated embodiment, an electric motor including a rotor 225 and a stator 230. The drive 205 can be co-aligned along the same axis of the shoulder 100, as in the illustrated embodiment. Alternatively, the drive 205 can be offset (not shown) and connected to the axis of actuation through a transmission, e.g., chain-driven. The drive 205 does not have to be electric, and can be a hydraulic, pneumatic, or a hybrid motor system. The drive 205 may comprise any type of drive known to the art, for example, a direct-drive motor, a servo motor, a motor-driven gearbox, an engine-driven gearbox, a rotary actuator, or the like. The drives 205 may be mechanically independent drives (i.e., not mechanically linked to each other). The shoulder motors 205 may be components of a power transmission system (e.g., a gearbox with clutched power take-offs) capable of operating each of the shoulder motors 205 independently.

The harmonic drive 210 and planetary gear set 215 implement a mechanical transmission. Some embodiments may also include a spur gear box, a traction drive, etc., in implementing a mechanical transmission. Mechanical transmissions have three primary applications in machine design: speed reduction, transferring power from one location to another, and converting motion from prismatic to rotary or vice versa. The shoulder joint 100 employs the mechanical transmission for speed reduction, which proportionally increases torque to rotate the wheel assembly 104. For most moving parts, bearings are used to reduce friction and typically are designed in pairs to protect against radial, thrust, and moment loading on the actuator. Since the bearings transfer loads, the structure or housing of the shoulder actuator should be designed adequately to preclude structural failures and deflections. The harmonic drive 210 provides a first speed reduction and the planetary gear set 215 provides a second speed reduction.

The motor 205 and the transmission (i.e., the harmonic drive 210 and planetary gear set 215) may be considered the heart of the actuator for the shoulder joint 100. The remaining components facilitate the operation of the motor 205 and the transmission and may be omitted in various alternative embodiments (not shown). A clutch assembly (i.e., the slip clutch 220) may be integrated such that the linked wheel assembly 104 may be disengaged (not powered or controlled) where positioning is passive based only on gravity effects. The slip clutch 220 also limits the torque through the drive system and is capable of dissipating energy to prevent damage. Similarly, a torsion assembly (i.e., the torsion bar assembly 225) may be used to control the twist properties of the shoulder joint 100 by actively engaging different effective torsion bar lengths.

Thus, some embodiments may include the slip clutch 220 and/or the torsion bar assembly 225, whereas others may omit them. Furthermore, recent actuator development has shown the tendency to mount the motor servo-controller electronics close to the motor. If the drive 205 is brushless, the commutation sensor (not shown) and drive electronics (also not shown) could also be packaged in the actuator assembly. Thus, in some embodiments, the motor servo-controller electronics may comprise a portion of the shoulder joint 100. In the illustrated embodiment, the commutation sensors (not shown) are located in the stator.

Figure 4A:
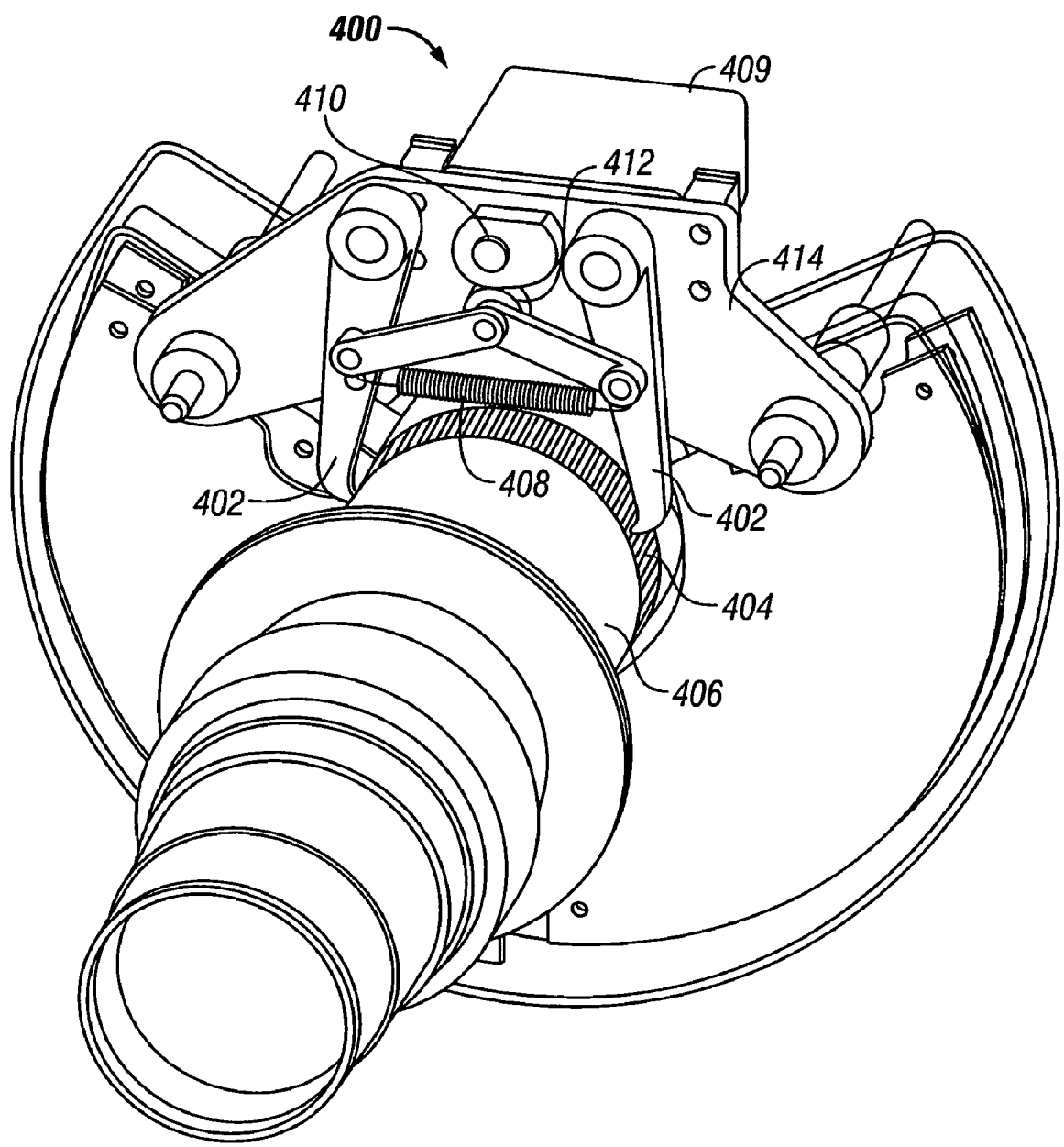
FIG. 4A–FIG. 4C illustrate a locking mechanism, a plurality of encoders, and a plurality of slip rings for the shoulder joint of the embodiment in FIG. 2A–FIG. 2B.
Figure 4B:
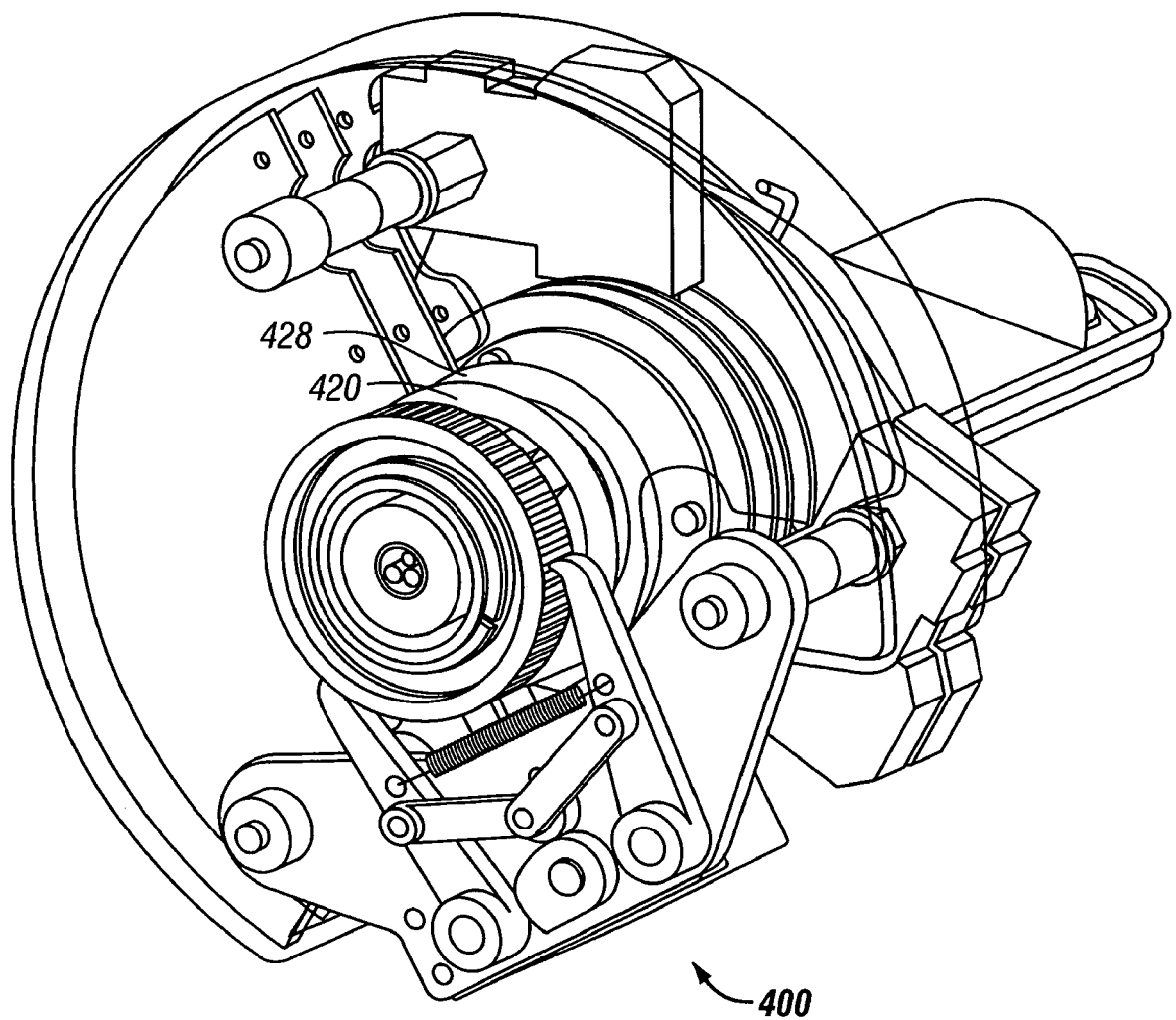

As is shown in FIG. 4A–FIG. 4B, a small spring applied, electrically released locking mechanism 400 prevents rotation of the motor so that power is not required when the vehicle 102 is static. The locking mechanism 400 does not require power to maintain its state. Power is only required to change states; that is to lock or unlock. Furthermore, no state change will occur after power failure. If the locking mechanism 400 is locked, it will remain locked in the event power fails. If the locking mechanism 400 is unlocked, it will remain unlocked upon loss of power.

More particularly, the locking mechanism 400 of the illustrated embodiment includes a pair of pawls 402 that interact with a toothed lock ring 404 on the motor shaft 406 of the drive 205. A spring 408, or some other biasing means, biases the pawls 402 to close on the lock ring 404 when the cam 410 is positioned by the servo-motor 409 to allow for movement of the driver 412 and linkage. To unlock the locking mechanism 400, the servo-motor 409 actuates the cam 410 to operate against driver 412 and open the pawls 402 away from the lock ring 404. Note that the pawls 402, the servo-motor 409, cam 410, and driver 412 are all mounted to a mounting plate 414 that is affixed to the chassis 108 (shown in FIG. 1). When the lock is engaged, no power is required. However, in some alternative embodiments, a spring applied brake may be used to facilitate locking the actuator shaft 406. In these embodiments, the locking mechanism 400 will still lock the shoulder joint 100 on power failure, but will consume power, when unlocked, as long as power is available.

FIG. 4B also illustrates a plurality of encoders. To know the absolute position of the shoulder joint 100, a position sensor such as a resolver, encoder, or potentiometer is used to measure for this information. The illustrated embodiment employs an arm position encoder 428 and a torsion bar twist encoder 420 to acquire data regarding the position of the arm 304 and the twist on the torsion bar assembly 225, respectively. From this data, a control system (not shown) can determine the arm speed, arm reaction torque, and estimated suspension load for the shoulder joint 100. Note that some embodiments may integrate a tachometer and calculate the same position data using simple calculus.

Figure 4C:
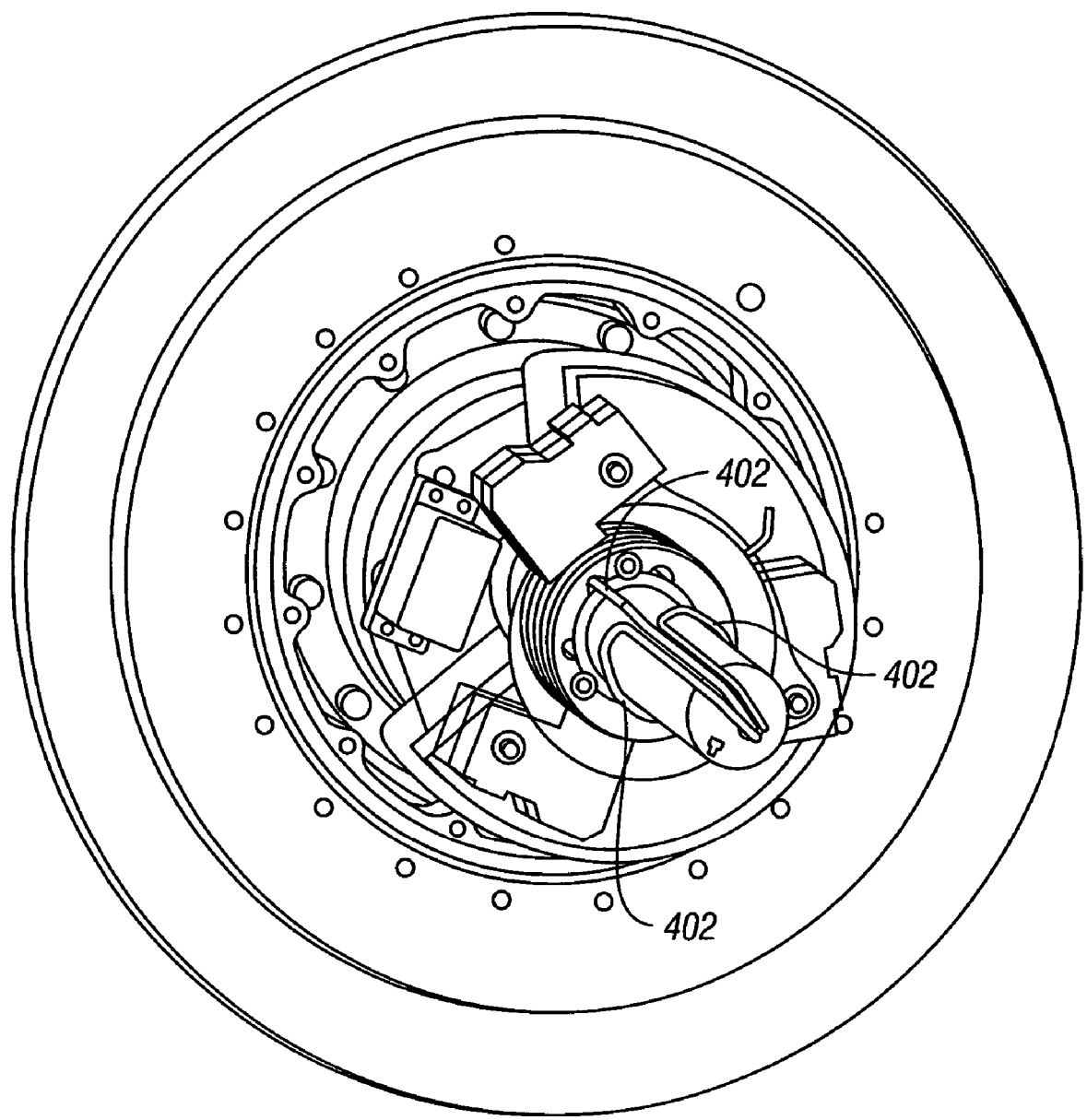

Returning to FIG. 2A–FIG. 2B, the drive 205, sensors (not shown), electronics (also not shown), and locking mechanism 400 all require power. Power is provided by the vehicle 102 (shown in FIG. 1) to each shoulder joint 100 and moreover, some power is passed through from the vehicle chassis 108 through the shoulder joint 100 and to the driven-hub 302 to drive the wheel 300. In addition to power, data signals follow the same path. To pass power and data signals over the rotary shoulder joints 100, a plurality of slip rings 432, shown in FIG. 4C are used. The supply of power should be isolated from data due to noise issues, and the illustrated embodiment employs separate slip rings to transmit power and data. Note that conductors (not shown) are attached to each side of the slip rings 432 with each side rotatably in contact with each other to maintain continuity.

Other options include the integration of a rotary damper to add suspension characteristics. Primary suspension damping for the vehicle 102 in FIG. 1 is provided in the illustrated embodiment by a controllable, magnetorheological ("MR") fluid based, rotary damper 110 connecting the suspension arm 304 to the chassis 108, mounted in parallel with the shoulder joint 100. The rotary MR damper 110, first shown in FIG. 1 but best shown in FIG. 5A–FIG. 5H at each suspension arm 304 provides actively variable damping torque controlled by a central computer (not shown). This control allows for optimized vehicle dynamics, improved traction, articulation, impact absorption and sensor stabilization. The system improves obstacle negotiation by enabling the shoulder joints 100 to be selectively locked, improving suspension arm 304 position control. Damping is controllable via a magnetically sensitive fluid. The fluid shear stress is a function of the magnetic flux density. The flux is generated by an integrated electromagnet that is capable of varying the resultant damping torque in real time.

The MR rotary damper 110 controls the applied torque on the shoulder joint 100 during all of the vehicle operational modes. It provides the muscle to the vehicle 102 for absorbing impacts, damping the suspension and accurately controlling the position of the joint. The MR rotary damper 110 increases traction and decreases the transmission of vertical accelerations into the chassis 108. The MR damper 110's ability to change damping force in real-time via software control maintains suspension performance over all operating conditions, such as changing wheel loads, varying wheel positions, and varying the vehicle 102 center of gravity.

Figure 5A:
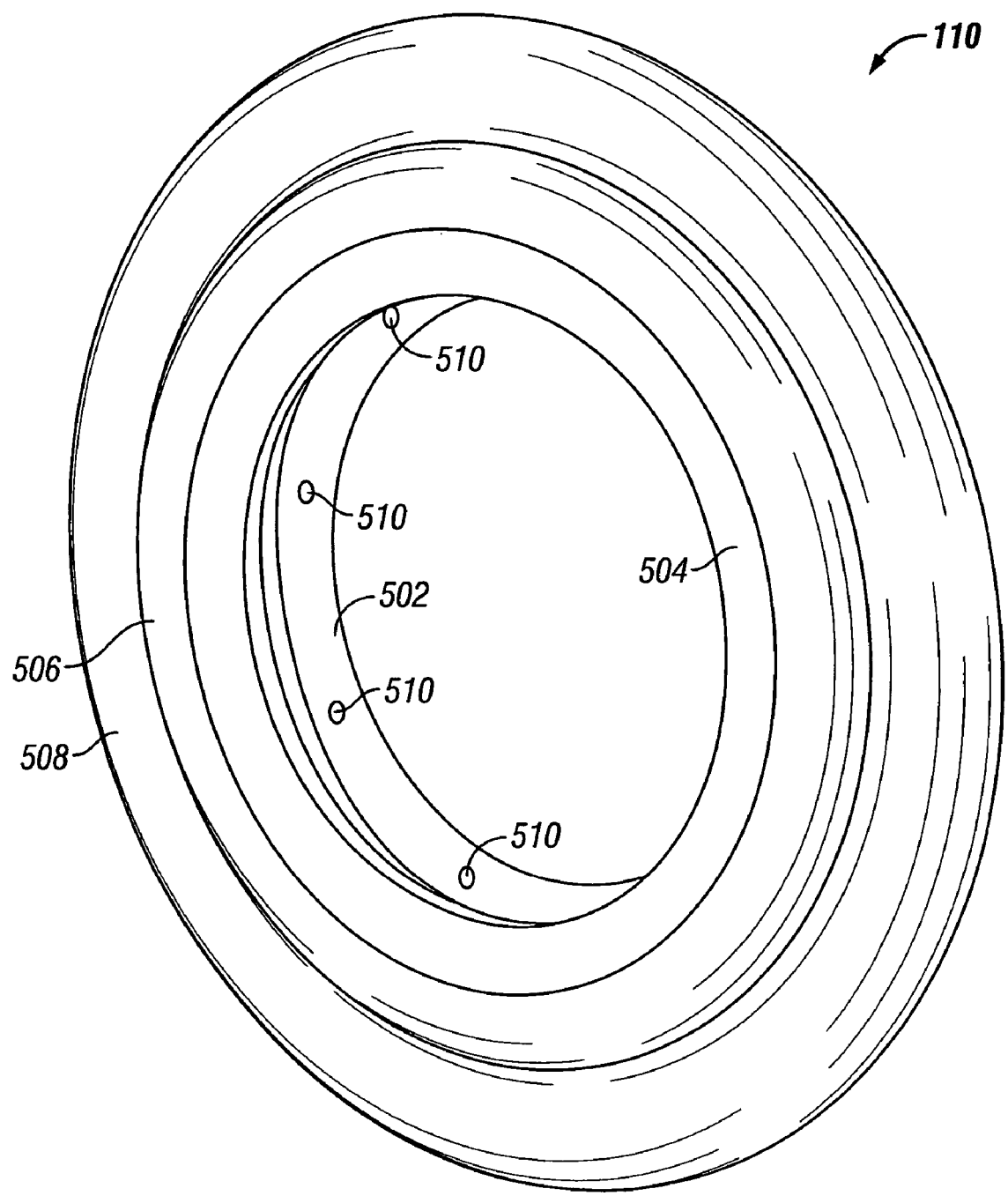
FIG. 5A and FIG. 5C detail the magnetorheological rotary damper of the wheel assembly of FIG. 1.
Figure 5B:
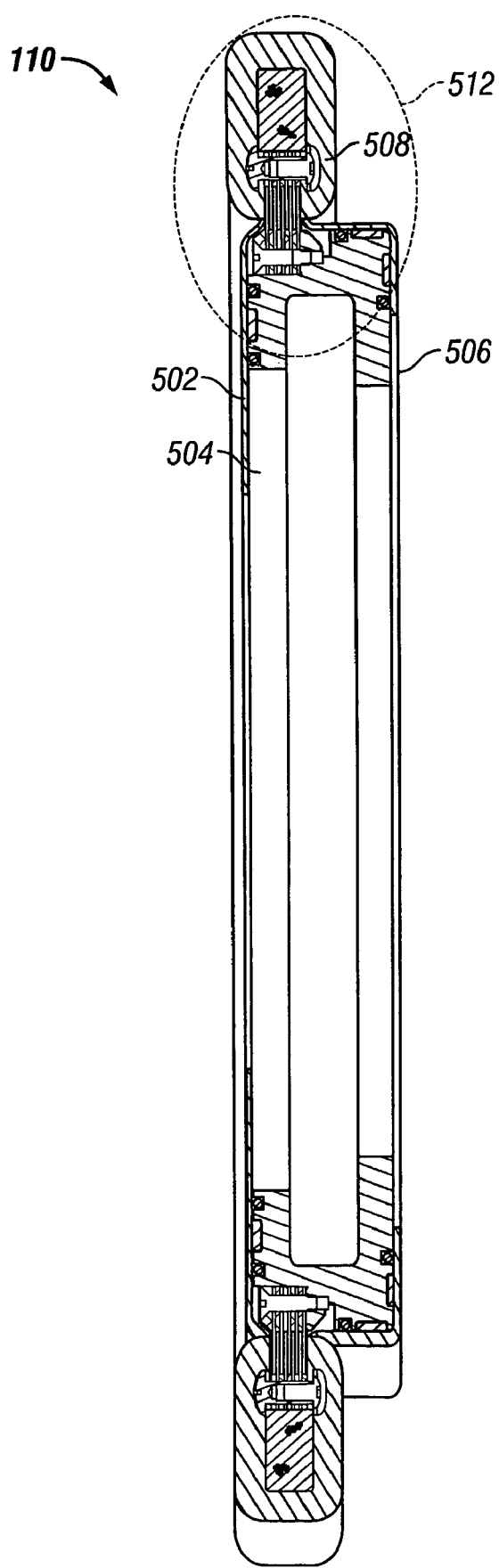
Figure 5C:
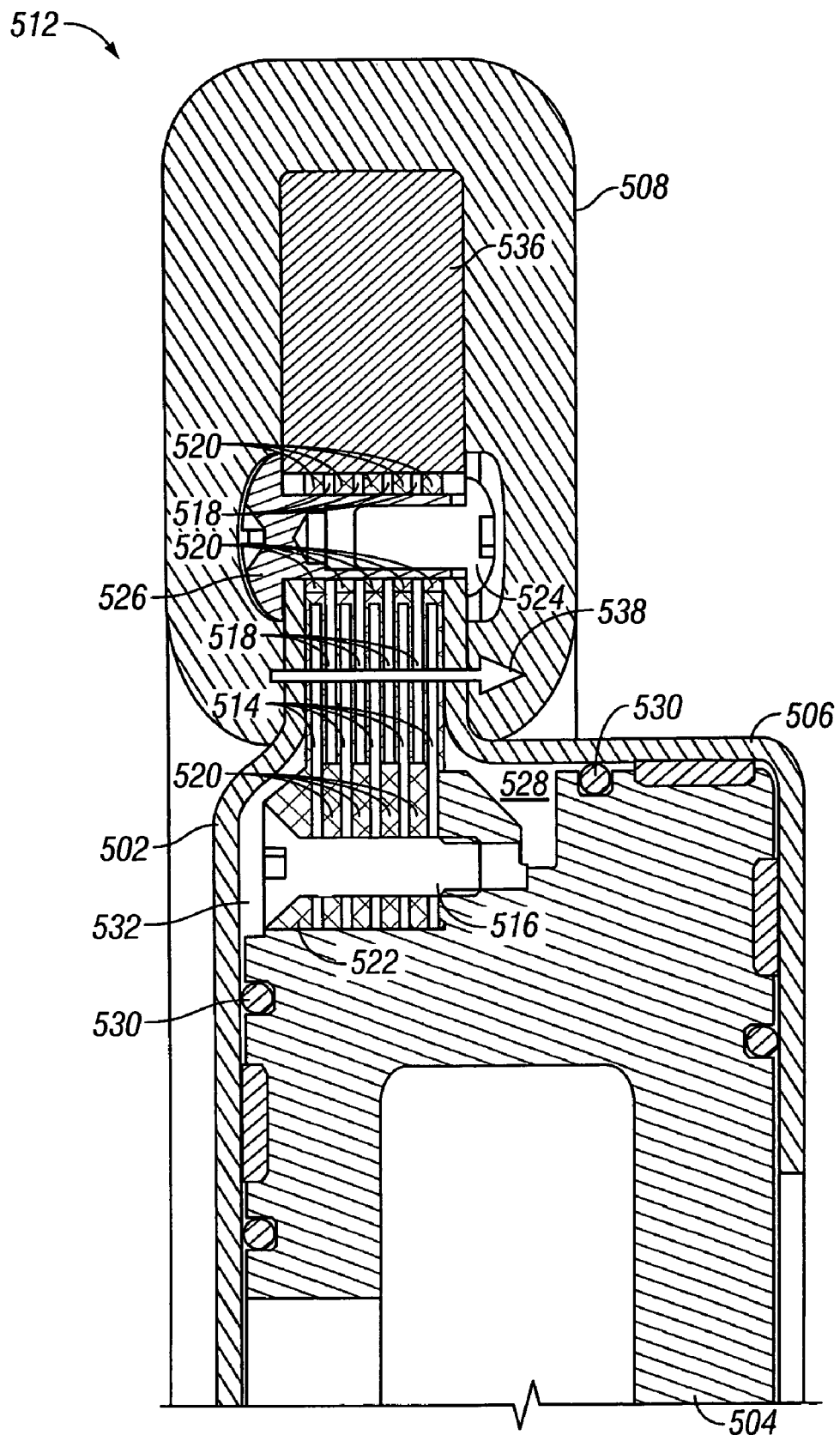

Turning now to FIG. 5A–FIG. 5C, the rotary damper 110 includes an inner housing 502, a rotor 504, an outer housing 506, and a segmented flux housing 508. The inner housing 502, outer housing 506, and segmented flux housing 508 are fabricated from a "soft magnetic" material (a material with magnetic permeability much larger than that of free space), e.g., mild steel. The rotor 504 is made from a "nonmagnetic" material (a material with magnetic permeability close to that of free space), e.g., aluminum. In one embodiment, the segmented flux housing 508 is fabricated from a high performance magnetic core laminating material commercially available under the trademark HIPERCO 50® from:

Carpenter Technology Corporation

P.O. Box 14662

Reading, Pa. 19612-4662

U.S.A.

Phone: (610) 208-2000

FAX: (610) 208-3716

However, other suitable, commercially available soft magnetic materials, such as mild steel, may be used.

The rotary damper 110 is affixed to, in this particular embodiment, a chassis 108 by fasteners (not shown) through a plurality of mounting holes 510 of the inner housing 502. The rotor 504 is made to rotate with the pivoting element (not shown) with the use of splines or drive dogs (also not shown). Note that the rotary damper 110 may be affixed to the suspension arm 304 and the chassis 108 in any suitable manner known to the art. The rotary damper 110 damps the rotary movement of the arm pivot relative to the chassis 108 in a manner more fully explained below.

Referring to FIG. 5C, pluralities of rotor plates 514, separated by magnetic insulators 520, are affixed to the rotor 504 by, in this particular embodiment, a fastener 516 screwed into the rotor plate support 522 of the rotor 504. A plurality of housing plates 518, also separated by magnetic insulators 520, are affixed to an assembly of the inner housing 502 and outer housing 506, in this embodiment, by a fastener 524 in a barrel nut 526. Note that the assembled rotor plates 514 and the assembled housing plates 518 are interleaved with each other. The number of rotor plates 514 and housing plates 518 is not material to the practice of the invention.

The rotor plates 514 and the housing plates 518 are fabricated from a soft magnetic material having a high magnetic permeability, e.g., mild steel. The magnetic insulators 520, the fasteners 516, 524, and the barrel nut 526 are fabricated from nonmagnetic materials, e.g., aluminum or annealed austenitic stainless steel. The nonmagnetic fasteners can be either threaded or permanent, e.g., solid rivets. The rotor plates 514 and the housing plates 518 are, in this particular embodiment, disc-shaped. However, other geometries may be used in alternative embodiments and the invention does not require that the rotor plates 514 and the housing plates 518 have the same geometry.

Still referring to FIG. 5D, the assembled inner housing 502, rotor 504, and outer housing 506 define a chamber 528. A plurality of O-rings 530 provide a fluid seal for the chamber 528 against the rotation of the rotor 504 relative to the assembled inner housing 502 and outer housing 506. An MR fluid 532 is contained in the chamber 528 and resides in the interleave of the rotor plates 514 and the housing plates 518 previously described above. In one particular embodiment, the MR fluid 532 is MRF132AD, commercially available from:

Lord Corporation

Materials Division

406 Gregson Drive

P.O. Box 8012

Cary, N.C. 27512-8012

U.S.A

Ph: 919/469-2500

FAX: 919/481-0349

However, other commercially available MR fluids may also be used.

The segmented flux housing 508 contains, in the illustrated embodiment, a coil 536, the segmented flux housing 508 and coil 536 together comprising an electromagnet. The coil 536, when powered, generates a magnetic flux in a direction transverse to the orientation of the rotor plates 514 and the housing plates 518, as represented by the arrow 538. Alternatively, a permanent magnetic 540 could be incorporated into the flux housing 508 to bias the magnetic flux 538. The coil 536 drives the magnetic flux through the MR fluid 532 and across the faces of the rotor plates 514 and the housing plates 518. The sign of the magnetic flux is not material to the practice of the invention.

The magnetic flux 538 aligns the magnetic particles (not shown) suspended in the MR fluid 532 in the direction of the magnetic flux 538. This magnetic alignment of the fluid particles increases the shear strength of the MR fluid 532, which resists motion between the rotor plates 514 and the housing plates 518. When the magnetic flux is removed, the suspended magnetic particles return to their unaligned orientation, thereby decreasing or removing the concomitant force retarding the movement of the rotor plates 514. Note that it will generally be desirable to ensure a full supply of the MR fluid 532. Some embodiments may therefore include some mechanism for accomplishing this. For instance, some embodiments may include a small fluid reservoir to hold an extra supply of the MR fluid 532 to compensate for leakage and a compressible medium for expansion of the MR fluid 532.

Returning to the illustrated embodiment, the control system commands an electrical current to be supplied to the coil 536. This electric current then creates the magnetic flux 538 and the rotary damper 110 resists relative motion between the housings 502, 506 and the rotor 504. Depending on the geometry of the rotary damper 110 and the materials of its construction, there is a relationship between the electric current, the relative angular velocity between the housings 502, 506 and the rotor 504, and the resistive torque created by the rotary damper 110. In general this resistive torque created by the rotary damper 110 increases with the relative angular motion between the housings 502, 506 and the rotor 504 and larger magnetic flux density through the fluid 532 as generated by the coil electric current.

Unfortunately, the MR rotary damper 110 tends to have a high inductance. This problem can be mitigated with the use of high control voltages which allow for high rates of change in damper current (di/dt), although this may lead to increased power demands and higher levels of inefficiency depending on the design and the software control driving the rotary damper 110. Another technique, which may improve the bandwidth and efficiency of the MR rotary damper 110, uses multiple coil windings. One such system could use two coil windings; one high inductance, slow coil with a high number of turns of small diameter wire and a second low inductance, fast coil with a low number of turns of larger diameter wire. The slow coil would could be used to bias the rotary damper 110 while the fast coil could be used to control around this bias. However, the two coil windings may be highly coupled due to the mutual inductance between them in some implementations, which would be undesirable.

Returning to FIG. 4B, the vehicle 102 employs a suspension arm positions encoder 428 for each suspension arm 304. The arm position encoders 428 measure the relative position of the respective suspension arms 304 to the chassis 108. In various alternative embodiments, the arm position encodes may be implemented as optical encoders, resolvers, or potentiometers. From this measurement a control system 114, shown in FIG. 1, can also determine the relative angular velocity of the suspension arms 304. As a simple damper, the MR rotary damper 110 would be commanded to produce a torque proportional to and against the suspension arm angular velocity.

More advanced control algorithms could command the MR rotary damper 110 to produce a resistive torque related to other variables such as: the positions of the suspension arms 304 relative to the chassis 108, the vertical acceleration on the chassis 108, the vehicle roll and pitch angles and angular rates, and the wheel hub motor torques (these would be determined by the vehicle control for controlling vehicle speed and turning). The illustrated embodiments also employ an inertial sensor 116 to help measure some of these variables. In various alternative embodiments, the inertial sensor can be implanted with gyroscopes (e.g., fiber optic, ring laser, mechanical) angular rate sensors, tilt sensors, and accelerometers.

Returning to FIG. 3A–FIG. 3B, the suspension arm 304 has a hollow construction that is structurally efficient and provides for mounting of motors, controller, wiring, etc., within the suspension arm 304. The suspension arm 304 is subject to multidirectional bending, shocks and debris impact/wear. The suspension arm 304 is, in the illustrated embodiment, made of ceramic (alumina) fiber reinforced aluminum alloy, i.e., the suspension arm 304 comprises a "metal matrix composite" material. This material provides for high thermal conductivity, high specific stiffness, high specific strength, good abrasion resistance and long fatigue life. Some embodiments may include ceramic particulate reinforcement in at least selected portions. The suspension arm 304 therefore also provides mechanical protection and heat sinking for various components that may mounted on or in the suspension arm 304. Note that the length of the suspension arm 304 may be varied depending on the implementation.

With respect to the wheel assemblies 105, each of the wheels 300 may comprise a pneumatic, semi-pneumatic, or solid tire. Vibrations or other undesirable motions induced into the vehicle 102 by rough terrain over which the vehicle 102 travels may be dampened by the mechanical compliance of the wheels 300. In other words, the wheels 300 deform to absorb the shock forces resulting from traveling over rough terrain. In addition, such shock forces may be absorbed by one or more shock absorbers, spring elements, and/or dampers, such as those known in the art, that are incorporated in the suspension arms 304. However, the illustrated embodiment employs the MR rotary damper 110, most clearly illustrated in FIG. 5A–FIG. 5H, and discussed above.

In the illustrated embodiment, the hub assemblies 302 include a drive mechanism comprising a hub drive motor (not shown) and a two-speed shifting in-hub transmission (also not shown) embedded in the hub of a wheel to allow for high and low speed operation with a hub drive motor. The hub assembly 302 is a tightly integrated package that combines a Variable Reluctance Motor ("VRM"), two-speed gear reduction, motor support frame and hub spindle. Mounted at the end of the suspension arm, it encapsulates the in-hub drive motor and provides support for wheel/tire loads and is waterproof.

Thus, as is shown in FIG. 1, the suspension system actually comprises a plurality of wheel assemblies 105, each rotated by a shoulder joint 100 and whose rotation is damped by a rotary magnetorheological ("MR") damper 110. The rotary magnetorheological ("MR") damper 110, facilitated by real time damping control, is mounted coaxially with the suspension arm 304 of the wheel assembly 105. Each wheel assembly 105 has a compliant rotary suspension with controllable damper 110 to absorb impacts and provide for sensor stability.

Still referring to FIG. 1, each of the wheel assemblies 105 is independently rotatably coupled with the chassis 108 by its shoulder joint 100. When a shoulder joint 100 is driven, the assembly 105 coupled therewith is rotated with respect to the chassis 108. Each of the wheel assemblies 105 may be independently moved by the respective drive 205 of its respective shoulder joint 100 to any desired rotational position with respect to the chassis 108 at a chosen speed. For example, each of the wheel assemblies 105 may be moved from a starting rotational position (or a "zero" or "home" rotational position) to a rotational position of 45° clockwise, to a rotational position of 180° counterclockwise, or to any other desired rotational position.

Figure 6A:
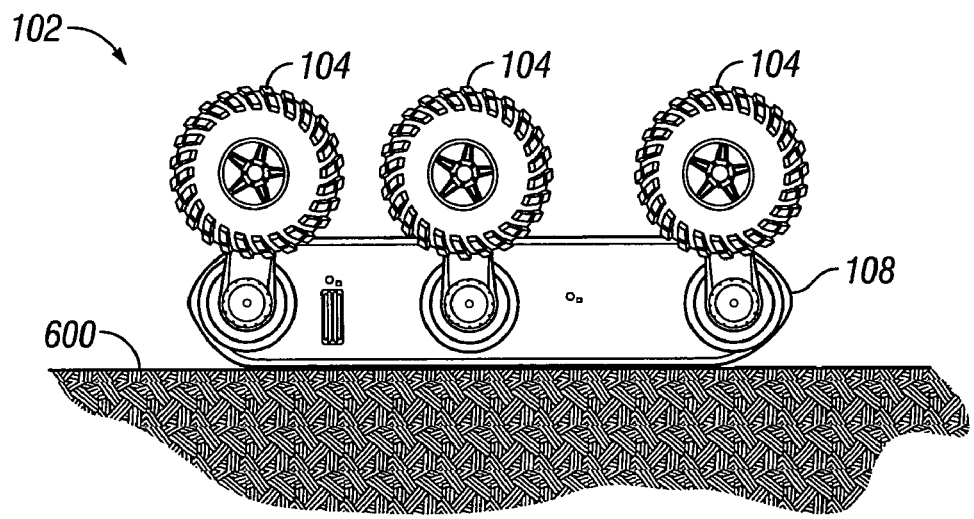
FIG. 6A–FIG. 6C illustrates the operation of the vehicle of FIG. 1 in an inverted position.
Figure 6B:
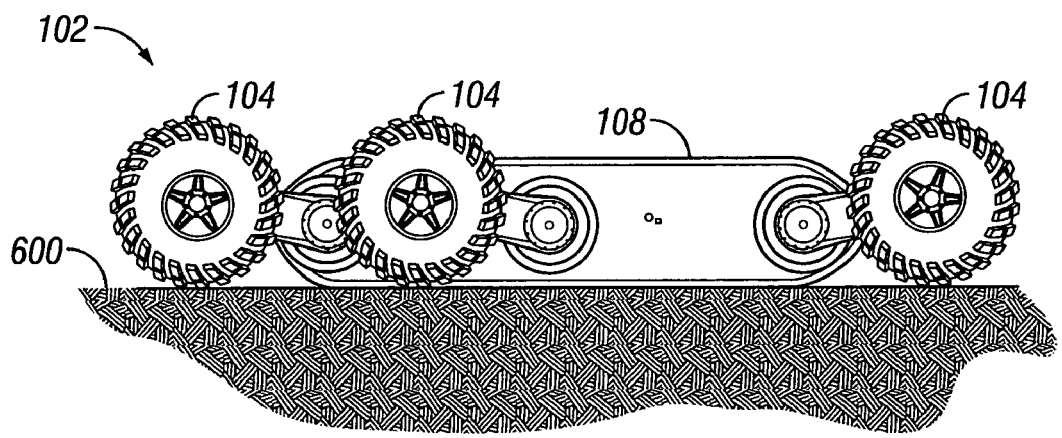
Figure 6C:
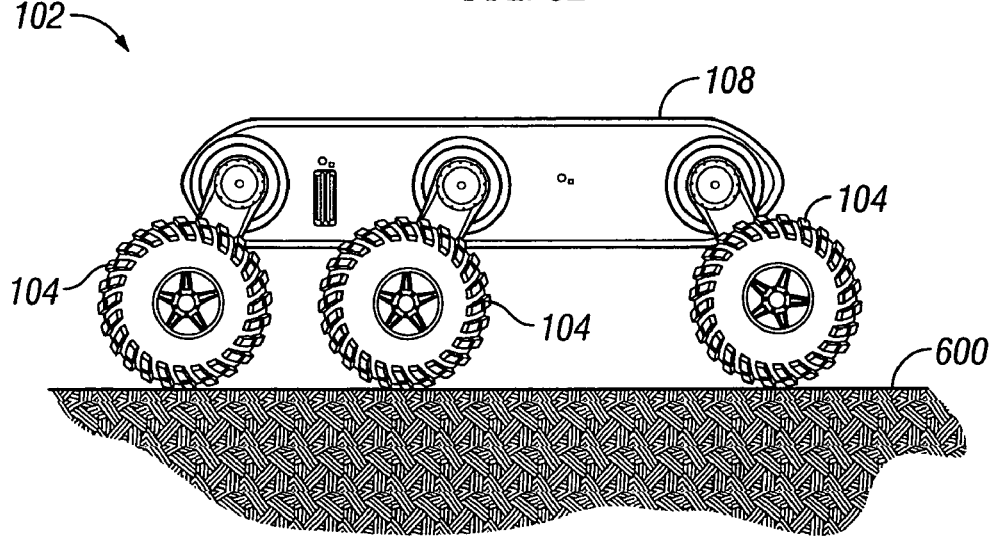

FIG. 6A–FIG. 6C illustrates the operation of the vehicle 102 of FIG. 1 in an inverted position. The slope negotiation capabilities of the vehicle 102 are dependant solely on available traction, not on rollover like many manned vehicles. Shifting the wheels 120 relative to the center of gravity (to evenly load the wheels 120) accommodates steep side slopes and ascents/descents. However, even if the vehicle 102 rolls over, there is only a notional "top" to this vehicle 102 design; the full, 360° rotation of the wheel assembles 105 about the shoulder joint 100 enables vehicle 102 reconfiguration for inverted operations in the event of a tumble or roll, thus alleviating the need for self-righting.

The vehicle 102 may encounter terrain so rugged or sloped that the vehicle 102 is turned over, as shown in FIG. 6A. As shown in FIG. 6B, the vehicle 102 may continue to traverse across the surface 600 by rotating the wheel assemblies 104 such that the wheels 300 contact the surface 600. As shown in FIG. 6C, the wheel assemblies 104 may then be further rotated to lift the chassis 108 from the surface 600, and the vehicle 102 may continue to traverse across the surface 600.

Figure 7:
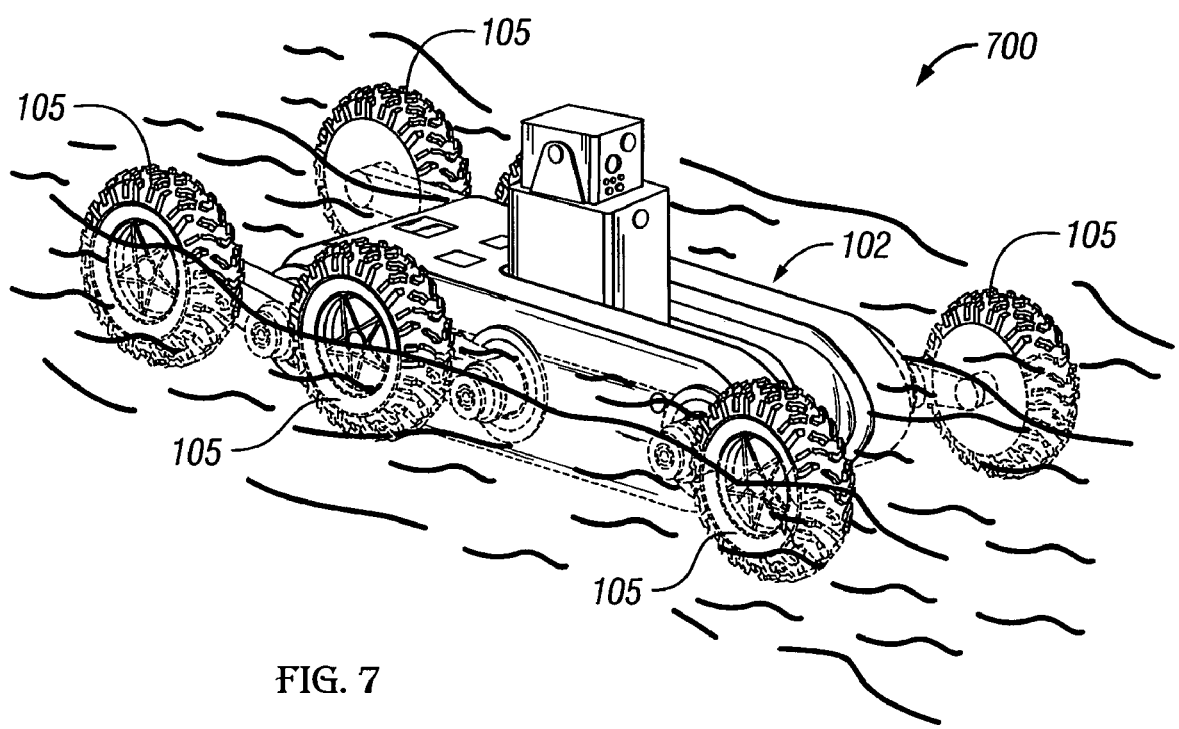
FIG. 7 illustrates the operation of the vehicle of FIG. 1 operating at least partially submerged.

FIG. 7 illustrates the operation of the vehicle 102 partially submerged in body of water 700. The shoulder joint 100, hub assembly 302, and rotary damper 110 are all sealed against water intrusion, thereby permitting operation of the vehicle 102 partially or wholly submerged. Techniques for sealing such structures are know to the art. For instance, fully submersible land vehicles employ snorkels (not shown) for delivering air to internal combustion engines when under water. Any such suitable techniques may be used.

The articulated suspension system of the illustrated embodiment employs six wheel assembly 105/shoulder joint 100 combinations (not all shown) positioned symmetrically about the chassis 108 in collinear pairs. However, this is not necessary to the practice of the invention. The precise number of wheel assemblies 105 and shoulder joints 100 will be implementation specific. The shoulder joints 100 need not be positioned about the chassis 108 symmetrically or in collinear pairs. Similarly, although the shoulder joints 100 are capable of fully rotating the wheel assemblies 105 in the illustrated embodiment, this is not necessary to the practice of the invention, either. Some embodiments may employ less than full rotation.

This concludes the detailed description. The particular embodiments disclosed above are illustrative only, as the invention may be modified and practiced in different but equivalent manners apparent to those skilled in the art having the benefit of the teachings herein. For instance, in some embodiments, the shoulder joint 100 may be prismatic to allow an additional degree of freedom in movement. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A shoulder joint for use in a vehicle suspension system, comprising:
    a housing to which a wheel assembly may be attached for in-plane rotation;
    a drive; and
    a transmission engaged with the housing and the drive to reduce the speed of the drive as it drives the housing, the transmission including:
        a harmonic drive engaged with the shoulder drive and capable of reducing the speed of the shoulder drive; and
        a planetary gearset capable of further reducing the speed of the shoulder drive and engaging the housing to drive it.

2. The shoulder joint of claim 1, wherein the shoulder drive is co-aligned with the axis of the shoulder joint.

3. The shoulder joint of claim 1, wherein the shoulder drive is offset from the axis of the shoulder joint.

4. The shoulder joint of claim 1, wherein the shoulder drive comprises one of a direct-shoulder drive, a servo motor, a motor-driven gearbox, an engine-driven gearbox, and a rotary actuator.

5. The shoulder joint of claim 1, further comprising at least one of:
    a slip clutch between the planetary gearset and the housing to disengage the housing from the drive; and
    a spring preloading the planetary gearset and the harmonic drive.

6. The shoulder joint of claim 5, wherein the spring comprises a torsion bar assembly.

7. The shoulder joint of claim 1, further comprising a locking mechanism.

8. The shoulder joint of claim 7, wherein the locking mechanism comprises a small spring applied, electrically released locking mechanism.

9. The shoulder joint of claim 1, further comprising means for ascertaining the absolute position of the shoulder joint.

10. The shoulder joint of claim 9, wherein the ascertaining means comprises at least one of a resolver, an encoder, or a potentiometer.

11. The shoulder joint of claim 9, wherein the ascertaining means comprises at least one of an arm position encoder and a torsion bar twist encoder.

12. The shoulder joint of claim 1, further comprising a plurality of slip rings through which signals may be transmitted.

13. An integrated shoulder joint, comprising:
   a torsion bar;
   a shoulder drive;
   a harmonic drive engaged with the shoulder drive and capable of reducing the speed of the shoulder drive and preloaded by the torsion bar;
   a slip clutch capable of disengaging the harmonic drive from the shoulder drive; and
   a plurality of slip rings through which signals can be sent through the integrated shoulder joint.

14. The shoulder joint of claim 13, wherein the slip clutch limits the torque through a drive system of which the shoulder joint comprises a portion.

15. The shoulder joint of claim 14, wherein the slip clutch is capable of dissipating energy to prevent damage.

16. The shoulder joint of claim 13, wherein the slip clutch is capable of dissipating energy to prevent damage.

17. The shoulder joint of claim 13, further comprising locking mechanism capable of preventing rotation of the motor.

18. The shoulder joint of claim 17, wherein the locking mechanism is applied by a biasing means.

19. The shoulder joint of claim 18, wherein the biasing means comprises a spring.

20. The shoulder joint of claim 18, wherein the locking mechanism is electrically released.

21. The shoulder joint of claim 13, wherein the shoulder joint comprises a prismatic joint.

22. The shoulder joint of claim 13, wherein the shoulder joint offers multiple degrees of freedom of movement.

* * * * *